(No Model.) 2 Sheets—Sheet 2.
F. ZIELKE.
AUTOMATIC STOP FOR MACHINES.
No. 567,435. Patented Sept. 8, 1896.
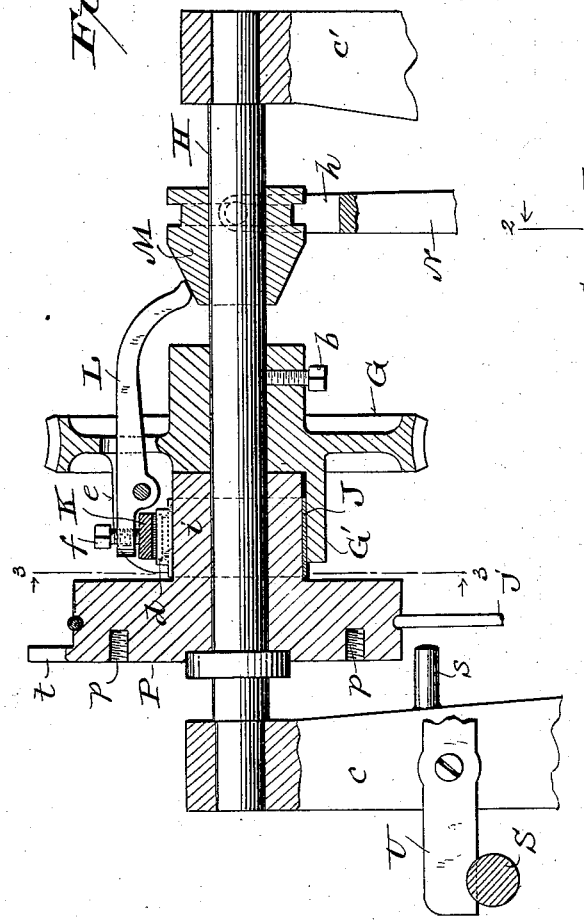
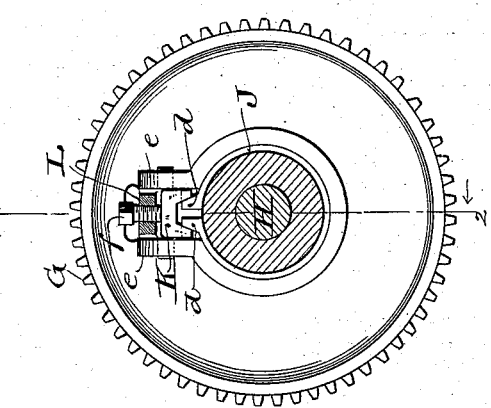
Witnesses:
Geo. W. Young,
N. E. Oliphant
Inventor
Fred Zielke
By H. G. Underwood
Attorneys

UNITED STATES PATENT OFFICE.

FRED ZIELKE, OF MARSHFIELD, WISCONSIN, ASSIGNOR OF ONE-HALF TO GEORGE SEUBERT, OF SAME PLACE.

AUTOMATIC STOP FOR MACHINES.

SPECIFICATION forming part of Letters Patent No. 567,435, dated September 8, 1896.

Application filed June 22, 1896. Serial No. 596,451. (No model.)

*To all whom it may concern:*

Be it known that I, FRED ZIELKE, a citizen of the United States, and a resident of Marshfield, in the county of Wood and State of Wisconsin, have invented certain new and useful Improvements in Automatic Stops for Machines; and I do hereby declare that the following is a full, clear, and exact description thereof.

My invention has for its object to provide a simple, economical, and efficient automatic stop mechanism especially designed for use in connection with machines for weaving spring-wire mattresses, but applicable to a variety of machines; and it consists in certain peculiarities of construction and combination of parts hereinafter set forth with reference to the accompanying drawings and subsequently claimed.

In the drawings, Figure 1 represents a perspective view of an automatic stop mechanism constructed according to my invention; Fig. 2, a detail sectional view of part of the mechanism, the plane of the section being indicated by line 2 2 in the succeeding figure; and Fig. 3, a similar view, indicated by line 3 3 in the preceding figure.

Referring by letter to the drawings, A represents a drive-shaft that may constitute part of a machine for weaving spring-wire mattresses, this shaft being shown with a loose pulley B and fast pulley C for a belt D, the latter being moved from one to the other of the pulleys by means of a shifter E, that constitutes part of my improved automatic stop mechanism. The pulley-and-belt gear is shown and described as a matter of convenience, it being understood that the shifter E may be made to coöperate with a clutch, friction, or such other start-and-stop gear as may be employed in connection with the drive-shaft A of the wire-weaving machine. Fast on shaft A is a worm F in mesh with a worm-wheel G, rigidly secured to a spindle H by a set-screw $b$ or other suitable means, the spindle being journaled in standards $c$ $c'$ on a horizontal plate I, that in practice is made fast to any suitable support. Contained in an annular flange G' of the worm-wheel is a split friction-band J, having its extremities provided with outwardly-extended wedge-ears $d$, that engage a corresponding wedge-groove in a block K, arranged between parallel wings $e$, that flank a longitudinal recess in the aforesaid flange. The block K is opposed by a screw $f$ in a lever L, fulcrumed to the flange-wings $e$ of the worm-wheel and extended through the latter to have working contact with a cone M, that is longitudinally adjustable on the spindle H, the adjustment being effected by tilt of a bell-crank N, fulcrumed to a lug $g$ on plate I and having a spanner extremity $h$ engaged with said cone. Engaging the friction-band J is the hub $i$ of a pulley P, that turns on spindle H, and fast on the pulley is one end of a flexible hanger $j$ for a weight Q of any suitable dimensions.

The bell-crank N is shown as having that end thereof farthest from the cone-spanner provided with an antifriction-roller engaging a cam-bracket R, made fast to a loose rod S, that is centered in vertical guide-arms $k$ $k'$ on plate I, and carries the shifter E above specified. A spiral spring T is arranged on rod S intermediate of guide-arm $k$ and a suitable stop $m$, that is herein shown as a head of said rod.

Pivotally connected to the standard $c$ is a preferably spring-controlled latch U, that engages with a recess $n$ in rod S, and a cam-trip V, connected to pulley P, coöperates with the latch to bring it out of the rod-recess.

The rod S is connected to a pull W, and a pull X is connected to latch U, these pulls being preferably flexible and designed for connection with treadles or levers within easy reach of the operator of the wire-weaving machine.

The pulley P is provided with tapped openings $p$ at suitable intervals on a circle for engagement of a cam-trip set-screw $r$, and thus provision is made for adjustable connection of the cam-trip with said pulley. A pin $s$, extending in from standard $c$, comes in the path of a lug $t$ on pulley P to check rotation of the latter when under the power of weight Q in flexible connection therewith, and the set of cam-trip V with relation to the pulley-lug determines the length of wire run by the weaving-machine before the latter is automatically stopped. From the foregoing it will be understood that the rod S is pulled said spindle in opposition to the lever, a bell-crank having spanner connection with the cone, a cam-bracket on said pull-rod engaging the bell-crank, and suitable means for imparting independent reverse movement to said pulley.

In testimony that I claim the foregoing I have hereunto set my hand, at Marshfield, in the county of Wood and State of Wisconsin, in the presence of two witnesses.

FRED ZIELKE.

(No Model.)
F. ZIGLER.
CROSSCUT SAW.
No. 567,436. Patented Sept. 8, 1896.
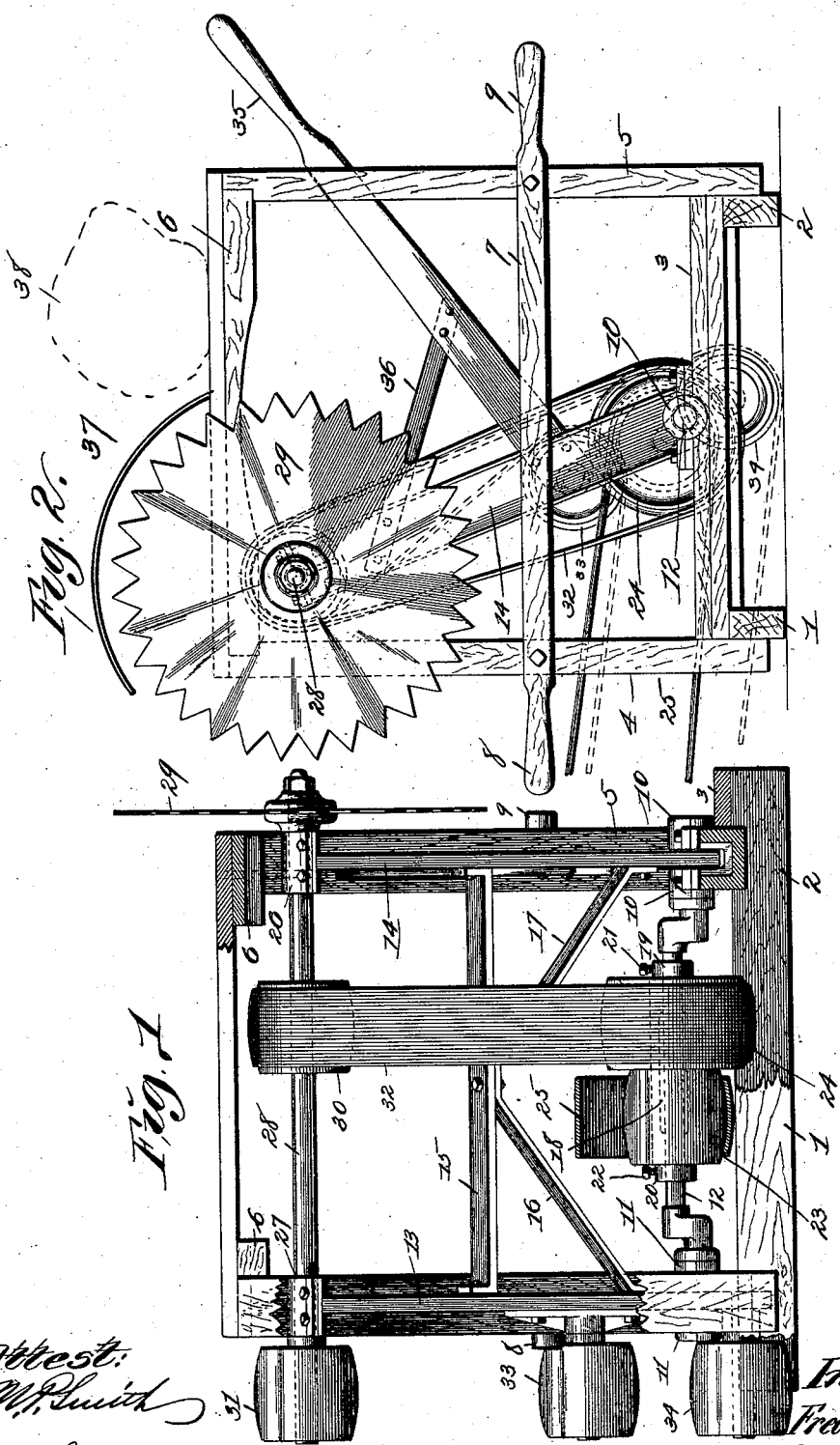

Witnesses:
JOHN F. COLE,
MATTIE E. ARMSTRONG.